Patented May 12, 1936

2,040,130

UNITED STATES PATENT OFFICE 2,040,130

PROCESS OF PREPARING 3-METHYLAL-n-PENTANE

Paul Halbig and Felix Kaufler, Munich, Germany, assignors to Dr. Alexander Wacker Gesellschaft für Elektrochemische Industrie G. m. b. H., Munich, Germany, a corporation No Drawing. Application March 31, 1933, Serial No. 663,850. In Germany April 12, 1932

9 Claims. (Cl. 260—141)

This invention relates to process of preparing 3-methylal-n-pentane.

We have discovered that 3-methylal-n-pentane may be obtained by subjecting butyraldehyde and acetaldehyde to aldol condensation, dehydrating the condensation reaction mixture, and hydrogenating the oily distillate.

We have also discovered that the yield of the aldol condensation reaction product is increased if an excess of acetaldehyde is used.

The process may be carried out in different ways. Butyraldehyde and acetaldehyde are reacted, preferably with an excess of acetaldehyde and at 3 to 10° C., in the presence of aldol condensation catalysts, such as an aqueous solution of sodium hydroxide, potassium hydroxide, potassium carbonate, dilute hydrochloric acid, etc. About 4 mols acetaldehyde are preferably employed to 1 mol butyraldehyde as we have found that the butyraldehyde in such case gives a better output and the self-condensation of the butyraldehyde, resulting in aldol with a chain of 8 carbon atoms, is also practically entirely eliminated. These proportions are therefore best calculated to permit the production of the condensation products on a commercial basis. The condensation reaction mixture is then dehydrated in the known manner, as by distillation, to form unsaturated aldehydes, such as crotonaldehyde and 3-methylal-n-pentene-(2). In distillation, unchanged acetaldehyde and butyraldehyde pass over first, which can be used again for the next preparation. The following distillate, crotonaldehyde and 3-methylal-n-pentene-(2) with water, separates into two layers. The upper oily layer comprises the unsaturated aldehydes, water and by-products and the lower layer consists mainly of water, which is returned into the retort. The oily layer is separated from the lower layer and is hydrogenated to form 3-methylal-n-pentane.

The hydrogenation may be effected in the liquid or vapor phase in the presence of a metal catalyst, and preferably under pressure. Hydrogenation in the vapor phase may be continued until saturated alcohols are obtained, such as butanol, 3-methylol-n-pentane, and a small amount of higher alcohols. The 3-methylol-n-pentane is separated and then dehydrogenated to 3-methylal-n-pentane, by passing it over a metal catalyst, such as copper, zinc, etc., at over 200° C.

*Example.*—720 parts by weight of butyraldehyde are mixed with 1760 parts by weight of acetaldehyde, and the mixture is slowly added to 100 parts by weight of a 24% aqueous solution of sodium hydroxide, preferably at 3 to 10° C. with constant stirring and cooling. The solution is acidified with acetic acid, 500 parts by weight of water are added and the mixture is dehydrated by distillation. First unchanged acetaldehyde and butyraldehyde pass over which can be used again for the next preparation. At approximately 80° C. the distillate separates into two layers of which the lower, consisting mainly of water, is returned into the retort and the upper oily layer is collected. The distillation is continued until the boiling point of 100° is reached. The separated oily layer consists mainly of crotonaldehyde, 3-methylal-pentene-(2), water and by-products.

The oily layer of unsaturated aldehydes is added to a nickel catalyst on a kieselguhr carrier and reduced with hydrogen at a pressure of approximately 10 atmospheres at between 100 and 200° C. The double bonds of the unsaturated compounds become saturated, and the crude product is purified by fractional distillation. 750 parts of butyraldehyde, 550 parts of 3-methylal-n-pentane, and 70 parts of higher condensation products are recovered. 55% of the butyraldehyde is converted into 3-methylal-n-pentane.

The oily layer of crotonaldehyde, 3-methylal-n-pentene-(2), etc. may also be vaporized and passed with an excess of hydrogen over a nickel catalyst on a pumice carrier at between 100° and 160° C. The products of the reaction may be separated from hydrogen by condensing, and the condensed liquid subjected to fractional distillation. n-butanol and 3-methylol-n-pentane, and a small amount of higher alcohols are obtained. The 3-methylol-n-pentane is passed over a copper-zinc catalyst on pumice at about 280° C., and 3-methylal-n-pentane is obtained. 55% of the butyraldehyde is converted into 3-methylal-n-pentane.

The pure product is a colorless liquid, nonmiscible with water, soluble in alcohol, having a boiling-point of 114°; $D_4^{20}=0,814$. It has the formula

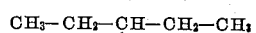

The invention claimed is:

1. Process comprising subjecting butyraldehyde and acetaldehyde to aldol condensation, dehydrating the condensation reaction mixture to obtain unsaturated aldehydes, hydrogenating the unsaturated aldehydes, and recovering 3-methylal-n-pentane.

2. Process comprising subjecting butyraldehyde and acetaldehyde to aldol condensation, distilling the condensation reaction mixture to obtain unsaturated aldehydes, hydrogenating the unsaturated aldehydes, and recovering 3-methylal-n-pentane.

3. Process comprising subjecting butyraldehyde and acetaldehyde to aldol condensation at between 3 and 10° C., distilling the condensation reaction mixture to obtain unsaturated aldehydes, hydrogenating the unsaturated aldehydes, and recovering 3-methylal-n-pentane.

4. Process comprising subjecting butyraldehyde and acetaldehyde to aldol condensation in the presence of an aqueous caustic alkali solution, acidifying and distilling the condensation reaction mixture to obtain unsaturated aldehydes, hydrogenating the unsaturated aldehydes under superatmospheric pressure in the presence of a nickel catalyst, and recovering 3-methylal-n-pentane.

5. Process comprising subjecting butyraldehyde and an excess of acetaldehyde to aldol condensation at between 3 and 10° C. in the presence of an aqueous caustic alkali solution, acidifying and distilling the condensation reaction mixture to obtain unsaturated aldehydes, hydrogenating the unsaturated aldehydes at about 10 atmospheres pressure in the presence of a nickel catalyst, and recovering 3-methylal-n-pentane.

6. Process comprising subjecting butyraldehyde and acetaldehyde to aldol condensation, distilling the condensation reaction mixture to obtain unsaturated aldehydes, vaporizing the unsaturated aldehydes and passing such vapor and hydrogen over a metal hydrogenation catalyst at an elevated temperature to obtain 3-methylol-n-pentane and carbinols, separating the 3-methylol-n-pentane, dehydrogenating the 3-methylol-n-pentane, and recovering 3-methylal-n-pentane.

7. Process comprising subjecting butyraldehyde and acetaldehyde to aldol condensation, distilling the condensation reaction mixture to obtain unsaturated aldehydes, vaporizing the unsaturated aldehydes and passing such vapor and an excess of hydrogen over a nickel catalyst at between 100 and 160° C. to obtain 3-methylol-n-pentane, separating the 3-methylol-n-pentane, passing the 3-methylol-n-pentane over a metal dehydrogenation catalyst at above 200° C., and recovering 3-methylal-n-pentane.

8. Process comprising subjecting butyraldehyde and an excess of acetaldehyde to aldol condensation at between 3° and 10° C. in the presence of an aqueous caustic alkali solution, acidifying and distilling the condensation reaction mixture to obtain unsaturated aldehydes, vaporizing the unsaturated aldehydes and passing such vapor and an excess of hydrogen over a nickel catalyst at between 100 and 160° C. to obtain 3-methylol-n-pentane, separating the 3-methylol-n-pentane, passing the 3-methylol-n-pentane over a metal dehydrogenation catalyst at above 200° C., and recovering 3-methylal-n-pentane.

9. In the process of preparing 3-methylal-n-pentane, the step of subjecting 1 mol of butyraldehyde and about 4 mols of acetaldehyde to aldol condensation.

PAUL HALBIG.
FELIX KAUFLER.